Oct. 4, 1966  W. D. TAYLOR  3,276,118
KNIFE BLADE STRUCTURE
Filed Oct. 19, 1964
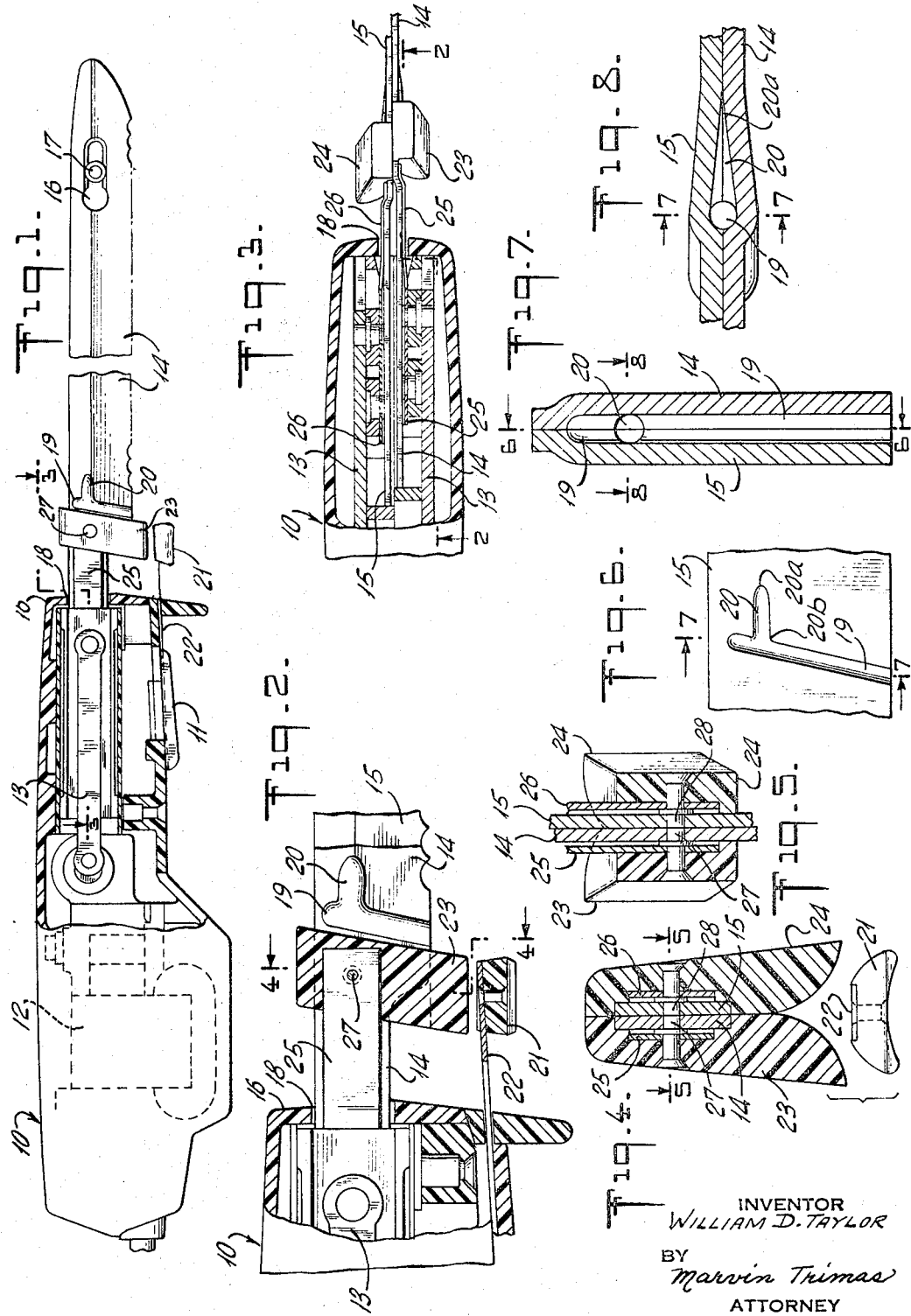
INVENTOR
WILLIAM D. TAYLOR
BY
Marvin Trimas
ATTORNEY

United States Patent Office 3,276,118
Patented Oct. 4, 1966

3,276,118
KNIFE BLADE STRUCTURE
William D. Taylor, New Castle, Del., assignor to Ronson Corporation, Woodbridge, N.J., a corporation of New Jersey
Filed Oct. 19, 1964, Ser. No. 404,716
8 Claims. (Cl. 30—272)

This invention relates to a knife blade having means thereon to prevent the entrance of fluids into a motor housing used to reciprocate the blades.

Power driven knives for household use have become well-known to housewives. One of the main disadvantages of the prior are power driven knives is that no inexpensive provision was made for excluding liquids picked up by the knife from entering the motor casing. It is obvious that such liquids have a deleterious effect on the motor in that it causes gummy deposits on the motor parts and, thus, harmfully affects the efficiency of the motor which in turn decreases the effectiveness of the knife blades driven thereby. A further disadvantage of having liquids enter the housing is that an electric hazard could arise in that the liquid could cause a short circuit and a serious shock could be rendered to the user of the device. In the prior art, it was necessary to resort to expensive structure in order to eliminate the latter disadvantage.

It is thus an object of this invention to provide on a knife a simple, inexpensive depression or channel means for preventing liquids from entering the motor housing.

Basically, the invention is applied to a pair of knife blades which are in contiguous relationship and are reciprocably driven by a motor. The knife blades are attached to the motor housing in such a way that they may be removed for cleaning. The knife blades are driven in such a manner that one knife is always moving relative to the other knife in a reciprocating fashion which simulates the motion one would use when cutting foods. If a foodstuff such as watermelon is being cut by a knife, it is well-known that the latter foodstuff contains much liquid. In cutting a watermelon the motor is actuated by the user of the knife and the blades are reciprocably driven thereby and the cutting edge of the blade is pressed in contact with the watermelon thereby cutting the latter. The juices in the watermelon find their way into the separation between the parallel driven knives and are forced rearwardly by the movement of the knives back toward the motor housing and by gravity when the knife is tilted upwardly. By placing diverting means in the form of a gutter or channel in the path of the liquids moving toward the motor housing, the fluids are trapped in the latter channel and the inertia of the fluid and gravity force the fluid downwardly away from the motor housing thus preventing the entrance of the fluid into the motor housing.

It is still a further object of this invention to provide a novel blade removing means from the power operated housing.

Since the blades used in power operated knives are extremely sharp, the blades are potentially dangerous and should be handled carefully. By means of a separator the knives can be removed from the housing using very slight force. It has been found that the more force one has to use in removing the blades, the more likely it is that his finger, if it slips on the wet knife, will brush past the sharp blade and severely injure him. Thus by using the present invention the positive locking means between the motor and the blades is removed by depressing a button and the blades can be removed with minimal pressure.

Additional and further objects and novel features will more fully appear from the detailed description as set forth below when the same is read with the accompanying drawing. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views:

FIG. 1 is a front view partially in section showing the knife blades attached to the motor housing;

FIG. 2 is a section looking in the direction of arrows in FIG. 3 showing the mechanism for releasing the blades from the motor driven cranks;

FIG. 3 is a top sectional view of FIG. 1 showing a manner of connecting the knife blades to the motor and to be driven thereby;

FIG. 4 is a side sectional view taken along the arrows shown in FIG. 2 showing the means for disconnecting the knife blades from the motor driven cranks;

FIG. 5 is a top view in the direction of the arrows in FIG. 4 showing further details of the knife disconnecting means;

FIG. 6 is a front view of the channel on a knife blade taken along the arrows in FIG. 7;

FIG. 7 is an end view taken of FIG. 6 showing the channels in the knife blades aligned;

FIG. 8 is a top view taken along the arrows in FIG. 7 showing the channels adjacent to each other and in position to release liquids from between the knife blades.

The motor housing 10 shown in FIG. 1 is actually the handle for the power driven knife which can be conveniently held by a user of the knife. The latter handle contains a switch 11 which is used to activate the electric circuit to the motor 12. Any well-known reciprocating drive means can be used to reciprocate the blades. For instance, a pair of cranks 13 on either side of the motor could be used which are eccentrically attached to a gear which in turn is driven by a worm gear. The driving means forms no part of this invention, therefore, greater detail on this aspect is considered unnecessary.

The knife blades 14 and 15 which can be hollow ground are arranged parallel to each other and in contiguous relationship. A conventional key hole slot 16 and pin 17 are used to maintain the blades in a contiguous and connected relationship and still permit relative motion of each blade with respect to the other. It should be understood however that any well-known connecting means can be used for that shown in the drawings. The blades 14 and 15 extend into the motor housing 10 through the slot 18 and are thence connected to the cranks 13 utilizing any conventional connector such as a pin and slot connection.

Located between the parallel blades 14 and 15 is a diverting means in the form of a groove or undercut portion 19. The latter groove is in the shape of a channel having a closed upper portion and an open portion located at the lower cutting part of the knife. Intersecting the groove 19 is another groove 20 which tapers from a narrow shallow forward portion 20a shown in FIG. 6 to a wider deeper portion 20b where the latter groove intersects the groove 19. The purpose of groove 20 is merely to provide a lead into the main groove 19. It is to be understood that the intersecting groove 20 could be eliminated and juices would still be forced through the channel 19. If desired, and in the preferred form of the invention, identical grooves are placed on both blades 14 and 15. In this manner, when the grooves line up, a large channel is presented through which a larger quantity of fluid can be passed than if only one groove on one blade is used. When hollow ground blades are used it is preferable to use grooves on both blades, because the grooves do not intersect at the hollow portions, therefore, each blade must have a fluid removing groove to remove fluids on that particular blade.

The knife blades operate somewhat in the manner of a pump, thus, the blades pick up juices at their forward end and the juices are thence forced rearwardly toward the motor housing where they are picked up by the groove 19 located on either one or both of the blades. The lead-in groove 20 as previously stated can be utilized to aid the juices in entering the channel 19. When the juices reach the groove 19, they are forced through the groove by the inertia of the fluid and gravity and thence harmlessly away from the motor housing. Since the groove 19 is located between the slot 18 and the outer tip portion of the knife blades, it is impossible for any fluids to get past the groove 19 and into the slot 18 because the groove 19 serves to intercept the fluid and redirect it away from the motor housing. The groove 19 is shown at an angle of approximately 10° from the vertical, however, the groove can be vertical or at any other angle which will lead liquids away from the motor housing.

Another feature of this invention is the manner in which the blades are inserted into and removed from interconnection with the motor housing. Provided forwardly of the motor housing is an outwardly extending separator 21 which is affixed to a flexible holding member 22, of any well-known flexible material. Above the separator 21 are two knife holding members 23 and 24 respectively which are resiliently biased toward each other by spring holding members 25 and 26. Mounted on the forward end of each of the spring members 25 and 26 are pins 27 and 28 respectively. The latter pins grip respective holes on the knife blades so as to retain the latter therewith. Similar pins may be located on the rear portion of the spring holding members 25 and 26 if desired to similarly coact with a similar set of holes on the rear of the knife blades 14 and 15. The separator 21 is formed with cam surfaces as shown best in FIG. 4, so as to coact with corresponding curved cam surfaces of the knife holding members 23 and 24. When the separator 21 is pressed upwardly, the cam surfaces of the separator contact the curved surfaces of the knife holding members 23 and 24 and bias the latter apart so as to remove the connection between the pins 27 and 28 and the holes 29 and 30 on the knife, thus, the knife blades can be easily removed from the motor housing 10.

In operating the knife, the user grasps the motor housing with one hand and the knife blades with the other and presses the separator 21 upwardly so as to separate the knife holding members 25 and 26 outwardly away from each other. The knife is then inserted between the knife holding members and into the slot 18 in the motor housing until the holes 29 and 30 are grasped by the pins 27 and 28 on the knife holding members. Since the knife holding members are biased inwardly toward each other the blades are resiliently held extremely close together. The user then places the motor housing in his hand at the narrowest portion of the housing as shown in FIG. 1 over the switch 11 and depresses the switch 11 which will complete a circuit to the electric motor and thereby actuate the latter. The cranks 13 are independently connected to a blade 14 and a blade 15 and reciprocate the latter with respect to each other. The user of the knife then places the sharp blades in contact with the item to be cut such as a tomato or a roast beef and by light pressure on the foodstuff he can slice therethrough. The juices which are received between the blades 14 and 15 are forced rearwardly toward the channel member 19. When the juices which are heading toward the motor housing reach the channel 19 they follow the route of least resistance by entering the channel and are thereby forced downwardly and away from the motor housing. The deleterious effect of these juices has thereby been completely avoided in a very simple and economical manner.

I claim:

1. In a power operated knife, a housing having a drive means therein, a pair of parallel knife blades operatively connected to the latter drive means, said knife blades being in contiguous relationship to be reciprocated by said drive means, at least one of said blades having diverting means integral therewith thereon located at a position ahead of said drive means and between said knife blades whereby liquids between said blades which are forced into said diverting means are thereby carried away from said housing containing the drive means.

2. In a power operated knife, a housing including a drive means therein, a pair of parallel knife blades removably connected to said drive means, at least one of said knife blades having undercut walls forming a channel thereon for the reception of fluids and being located at a position in front of said housing and between said knife blades so as to provide a pathway for fluids and prevent the ingress of the fluids into the knife housing.

3. In a power operated knife housing, a drive means located within said housing, a pair of parallel knife blades in contiguous relationship and connected with said drive means so as to be driven thereby, an undercut portion on each of said knife blades located between said blades and forwardly of said housing so as to receive fluids which are picked up by said knife blades to form a path for said fluids so as to prevent ingress of said fluids into said housing.

4. In a power operated knife, a housing, power means located within said housing, a pair of blades drivingly connected with said power means, a separator mounted on said housing having a cam surface thereon, a pair of knife retaining members mounted on said housing and above said separator and biased inwardly so as to receive said knife members, said knife retaining members having means thereon to receive said separator and to be biased outwardly by said separator and thereby release said knife blades.

5. In a power operated knife as defined in claim 4, said knife retaining members including pins thereon and said knife members having means thereon to receive said pins so as to be engaged thereby.

6. In a power operated knife, a housing, drive means in said housing, a pair of parallel knife blades in contiguous relationship and parallel with each other, said blades being interconnected with said drive means and adapted to be reciprocated by said drive means, said knife blades having connection means at their forward end so as to retain the knives in contiguous relationship, undercut walls forming a depression in said blades extending from an upper part to a lower knife edge part of each of said blades, said undercut walls being formed between said blades and adapted to receive fluids therein and guide said fluids away from said housing so as to prevent the latter fluids from entering into said housing.

7. In a power-operated knife, a housing, drive means in said housing, a pair of knife blades in contiguous relationship and parallel with each other, said blades being interconnected with said drive means and adapted to be reciprocated by said drive means, said knife blades having connection means at their forward end so as to retain the knives in contiguous relationship, a channel formed in the blades extending from an upper part to a lower knife edge part of each of said blades, and adapted to receive fluids therein and guide said fluids away from said housing so as to prevent the latter fluids from entering into said housing, said knife blades including a lead-in groove intersecting said channel formed in the blades so as to guide fluids into said channel.

8. In a power-operated knife, a housing, drive means in said housing, a pair of knife blades in contiguous relationship and parallel with each other, said blades being interconnected with said drive means and adapted to be reciprocated by said drive means, said knife blades having connection means at their forward end so as to retain the knives in contiguous relationship, a channel formed in the blades extending from an upper part to a lower knife edge part of each of said blades, and adapted to receive fluids therein and guide said fluids away from said housing so as to prevent the latter fluids from entering into said housing, said housing has attached thereto a separator member having a cam surface thereon, a pair of blade holding members each having a pin thereon to receive a corresponding portion of each knife blade to hold said knife blade at its rearward end in contiguous relationship, said blade retaining members having means thereon to receive said cam surface on the separator so as to be yieldably separated outwardly in order that said blades can be easily removed from said housing.

References Cited by the Examiner

UNITED STATES PATENTS

| | | | |
|---|---|---|---|
| 3,120,056 | 2/1964 | Gerry | 30—272 |
| 3,152,399 | 10/1964 | Knab | 30—272 |
| 3,189,998 | 6/1965 | Beisheim et al. | 30—272 |

WILLIAM FELDMAN, *Primary Examiner.*

JAMES L. JONES, JR., *Examiner.*